United States Patent [19]
Cartier et al.

[11] 3,866,019
[45] Feb. 11, 1975

[54] ELECTRICAL CONTROL CIRCUIT

[76] Inventors: Jean-Pierre Cartier, 279 Chemin-Dubois, Tiedmont; David Winn, 348 Notre Dame, East, Apt. 1C, Montreal, Quebec; Anthony L. Stelmach, 56 Brunet St., Point Claire, all of Canada

[22] Filed: Sept. 10, 1973

[21] Appl. No.: 395,835

[30] Foreign Application Priority Data
Sept. 14, 1972 Canada.............................. 151704

[52] U.S. Cl.................................. 219/485, 219/501
[51] Int. Cl. ............................................. H05b 1/02
[58] Field of Search ........... 219/480, 483, 485, 486, 219/497, 499, 501

[56] References Cited
UNITED STATES PATENTS

| | | | |
|---|---|---|---|
| 3,242,978 | 3/1966 | McGann......................... | 219/486 X |
| 3,383,495 | 5/1968 | Laube et al..................... | 219/485 X |
| 3,551,646 | 12/1970 | Harmon............................ | 219/485 |
| 3,597,588 | 8/1971 | Kirschner....................... | 219/485 |
| 3,751,631 | 8/1973 | Seager............................. | 219/485 X |
| 3,767,894 | 10/1973 | Berger............................. | 219/485 X |

*Primary Examiner*—J. D. Miller
*Assistant Examiner*—Fred E. Bell
*Attorney, Agent, or Firm*—Otto John Munz

[57] ABSTRACT

An electrical load monitoring and switching system comprises total load measuring means arranged to monitor an electrical supply, switch means connectible to control the supply of electrical power from said supply to partial load means forming a substantial part of a total load, but not forming the total load, and control means arranged to transfer the switch means between a closed condition in which said partial load means are energised as part of said total load from said supply, and an open condition in which said partial load means are no longer so energised, the control means being arranged to receive an input signal from said total load measuring means and to cause transfer of the switch means between the closed condition and the open condition when a first predetermined total load is exceeded, and further to effect a transfer of the switch means between the open condition and the closed position only when the total load falls to less than a second predetermined total load, the difference between the first predetermined total load and the second predetermined total load being larger than the maximum power which the said partial load means can extract from said supply.

10 Claims, 1 Drawing Figure

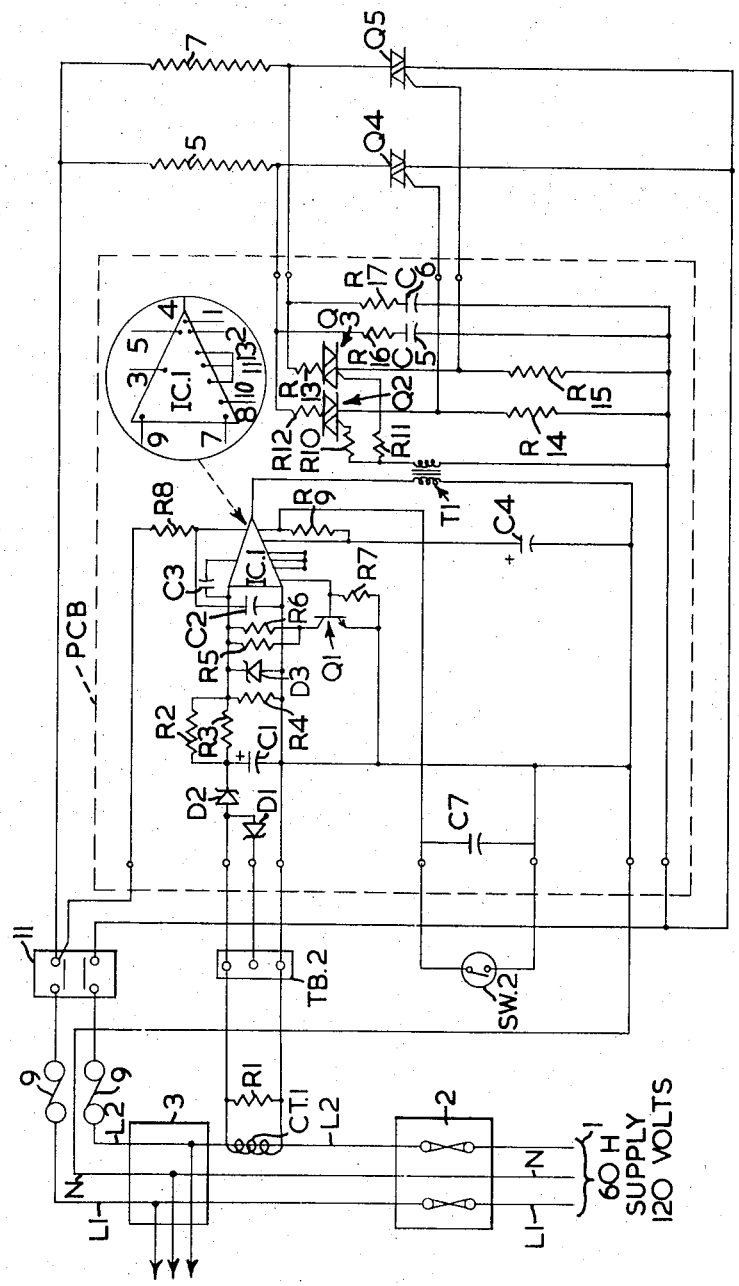

3,866,019

ELECTRICAL CONTROL CIRCUIT

This invention relates to a load monitoring and switching system, the use of which is not limited to, but does find particular application to, domestic electrical systems where a large but non-essential load, such as a swimming pool heating system, exists.

In the particular case mentioned, the rate of change of the temperature of the water of the swimming pool is so slow that it is practical to turn off the water heating system for a period of say one or two hours at a time in order to reduce the peak current taken by the whole domestic electrical system. As a result, when an existing domestic electrical system has added to it an electrical heating system for a swimming pool, it has been found possible to retain the existing 100 ampere or 200 ampere service entrance, since by use of the present invention the additional load represented by the swimming pool heating system can be off-loaded or shed whenever the total load on the supply rises above what is considered to be a safe level.

According to the present invention, an electrical load monitoring and switching system comprises, total load measuring means arranged to monitor an electrical supply, switch means connectible to control the supply of electrical power from said supply to partial load means forming a substantial part of a total load, but not forming the total load, and control means arranged to transfer the switch means between a closed condition in which said partial load means are energised as part of said total load from said supply, and an open condition in which said partial load means are no longer so energised, the control means being arranged to receive an input signal from said total load measuring means and to cause transfer of the switch means between the closed condition and the open condition when a first predetermined total load is exceeded, and further to effect a transfer of the switch means between the open condition and the closed position only when the total load falls to less than a second predetermined total load, the difference between the first predetermined total load and the second predetermined total load being larger than the maximum power which the said partial load means can extract from said supply.

The invention will now be described, by way of example, with reference to the accompanying Drawing, which is in the form of a circuit diagram of domestic electrical installation including swimming pool heating means.

The 240 volts 60 Hertz two phase power supply 1 to a house is indicated as passing through a unit 3 which consists of the typical mains fuses, breakers and meter circuit and through main distribution board 3, found in such an installation. As usual, the supply consists of line L1, line L2 and neutral N. The power supply for two parallel-connected but separately controlled swimming pool heaters 5 and 7 is shown as taken from unit 3 through two 60 ampere fuzes 9 and a high limit thermostatic switch 11, such as that known as THERMODISC HL. Connected in the circuit between one side of heater 5 and line L2 is a Triac Q4, and similarly a Triac Q5 is connected between one side of heater 7 and line 2.

On the supply side of the unit 3, a current transformer CT.1 is associated with lead L2 so as to provide at all times an output indicative of the current flowing in that lead. Since the heaters 5 and 7 are connected to operate from 240 volts, so that there is no current flow in the neutral line N, it is not necessary to monitor also the current in lead L2. The current transformer typically is of the single primary turn type which can be placed round the lead L2 and does not require any electrical connection to that lead. A resistor R1 is connected across the leads from the current transformer CT.1, and these leads are connected to the outer two of three terminals on a terminal block TB.2.

Associated with the swimming pool is a thermostatic switch SW.2, having normally closed contacts which open when the water in the swimming pool has reached a selected optimum temperature.

The control circuit of the present invention is, apart from the parts mentioned above, mounted on a printed circuit board PCB. To clarify the operation of the device, the circuit on the circuit board is shown in the drawing as a conventional circuit diagram. It is believed that a lead-by-lead description of that circuit would be redundant, and the components shown in the circuit are identified below:

RESISTORS
| | |
|---|---|
| R1 | type I.R.C. GBT ½ S.A.T. |
| R2 | type S.A.T. |
| R3 | 10,000 ohms , 2 watt |
| R4 | 180,000 ohms |
| R5 | 4,700 ohms |
| R6 | type S.A.T. |
| R7 | 39,000 ohms |
| R8 | 10,000 ohms , 2 watt |
| R9 | 47,000 ohms |
| R10 | 56 ohms |
| R11 | 56 ohms |
| R12 | 91 ohms , 1 watt wirewound |
| R13 | 91 ohms , 1 watt wirewound |
| R14 | 1,000 ohms |
| R15 | 1,000 ohms |
| R16 | 100 ohms |
| R17 | 100 ohms |

WATER HEATERS

Item 5 and item 7: each 5 kilowatts, 240 volts.

DIODES
| | |
|---|---|
| D1 | Zener Diode 10 volts type IN 5240 |
| D2 | Rectifier diode, 400 volts, 1A., IN 4004 |
| D3 | Zener diode, 10 volts, ½ watts, IN 5240 |

CAPACITORS
| | |
|---|---|
| C1 | 50 microfarads |
| C2 | 0.039 microfarads |
| C3 | 0.022 microfarads |
| C4 | 100 microfarads |
| C5 | 0.1 microfarads |
| C6 | 0.1 microfarads |
| C7 | .0033 microfarads |

ELECTRONIC SWITCHES
| | |
|---|---|
| Q1 | transistor, type 2N3704 |
| Q2 | Triac, 2½ amps type RCA 40527 |
| Q3 | Triac, 2½ amps type RCA 40527 |
| Q4 | Triac, 30 amps type RCA 40807 |
| Q5 | Triac, 30 amps type RCA 40807 |

TRANSFORMER
| | |
|---|---|
| T.1 | Pulse transformer, type ITT PTA |

INTEGRATED CIRCUIT
| | |
|---|---|
| IC.1 | type RCA CA 3059 |

The Triacs Q2, Q3, Q4 and Q5 referred to above are pulse operated electronic switches which conduct during each half cycle of the supply only when triggered by such a pulse. In such switches, the current controlled by the switch commences to flow only after zero voltage crossing points.

Considering now the operation of the circuit shown, basically the integrated circuit IC.1 controls the firing of the Triacs Q2 and Q3, which in turn control the firing of the main Triacs Q4 and Q5. Since the Triacs are all self-extinguishing, in the absence of driving pulses from the integrated circuit, each Triac will cease to conduct as the alternating voltage applied to its passes through zero in reversing polarity.

The integrated circuit IC.1, type RCA CA3059 is a standard package having numbered pins, and the inset on the drawing shows clearly the numbers of the pins to which the various leads are connected. As will be appreciated by those skilled in the art, output pulses normally appear on output pin 4. Pin 1 is the "inhibit" terminal of the integrated circuit, and unless this pin is grounded through the thermostatic switch SW.2 no pulses appear on pin 4. If the temperature in the swimming pool is, or rises to, the temperature setting of the thermostatic switch SW.2, no pulses will be produced and the heaters 5 and 7 will not be energised.

Assuming that the temperature of the pool is lower than the preselected temperature, this "inhibit" will not exist. The specified integrated circuit includes a comparator which compares the voltage applied to pin 9 with an internal reference voltage appearing on pins 10, 11 and 13. As long as the voltage on pin 9 is less than that on pin 13, the integrated circuit will produce pulses on pin 4 (in the absence of any "inhibit"). This voltage on pin 9 is derived from the output of the current transformer CT.1. The voltage produced in the winding of the current transformer will depend upon the current being taken from the supply 1. This voltage appears across resistor R1, is rectified by diode D1 and the fluctuating d.c. voltage is smoothed by the large capacitor C1. Resistors R2 and R3 in parallel, with series connected resistor R4, act as a potential divider, and the voltage across resistor R4 is applied between pins 7 and 9 of the integrated circuit pin 7 being "ground." The emitter of transistor Q1 is tied to ground, and a voltage is applied to its base from integrated circuit pin 8. When this voltage applied to the base of the transistor is sufficient to turn on the transistor Q1, the two resistors R5 and R6 in effect shunt the resistor R4, so that (considering the potential divider consisting of resistor R2 paralleled by resistor R3 on the one hand and paralleled resistors R4, R5 and R6 on the other hand), the voltage applied between pins 7 and 9 rises when transistor Q1 changes from a conducting mode to a non-conducting mode. Starting with the initial condition of a small load on the supply, and a small voltage therefore across capacitor C1, the voltage between pins 7 and 9 will be small and the voltage on pin 9 will be less than that on pin 13. Hence the integrated circuit produces output pulses on pin 4 and also produces a voltage on pin 8 sufficient to ensure that the transistor Q1 is conducting. As the load on the supply 1 increases, the voltage across capacitor C1 also rises, until the voltage across resistor R4 reaches such a value that the voltage on pin 9 exceeds that on pin 13. When this happens, the integrated circuit operates to stop the pulses on its pin 4 and also to reduce the voltage on its pin 8. This causes transistor Q1 to stop conducting, and as a result of the consequent stoppage of current through resistors R5 and R6, the voltage across resistor R4 rises still further.

It will be seen that when the load current exceeds a predetermined value, the output pulses on pin 4 are terminated. Further, that since the voltage on pin 9 which caused the termination of the pulses is then automatically stepped up to a higher value, an immediate reduction in the total load will not necessarily cause the voltage on pin 9 to fall to such a value that the integrated pulses will commence to emit triggering pulses for the Triacs.

With the arrangement and circuit values shown, the two water heaters 5 and 7 take a total load of 10 kilowatts, which at 240 volts is a current of about 42 amperes. The current transformer CT.1 produces on pin 9 of the integrated circuit IC.1 a sufficient voltage to stop the generation of pulses when the main service load reaches 80 amperes. The effect of cut-off of transistor Q1 is to increase the voltage applied to pin 9, so that the voltage on pin 9 does not fall below the value at which the integrated circuit can recommence to emit triggering pulses, until the load current monitored by current transformer CT.1 fall below 35 amperes.

Thus, when the heaters 5 and 7 are operating, if the total load on the system rises about 80 amperes, for example by the switching on of a space heating or cooking equipment or even by the cumulative effect of many relatively small loads in the installation, the integrated circuit IC.1 will cease to trigger the Triacs Q2 and Q3, and in turn those Triacs will cease to trigger the main load Triacs Q4 and Q5, so that the load on the installation will drop by about 40 amperes, to about 40 amperes plus the previous excess over 80 amperes.

The swimming pool heaters 5 and 7 will remain unenergised until the load on the system has dropped to less than 35 amperes, and will then be energised by the action of the integrated circuit IC.1 triggering the Triacs Q2 and Q3, which in turn will trigger the Triacs Q4 and Q5.

The circuit shown in the drawing includes a number of refinements which may be omitted, but which do improve either its operation or its general applicability. Thus, the Zener diode D1 is not effective when the circuit is used as shown, but can be used readily to convert the apparatus to operate with a house system having a rating of 200 amperes, compared with rating of 100 amperes in the example shown. When a 200 ampere system is involved, the connection from the top of transformer CT.1 is transferred from the top terminal on terminal block TB.2 to the middle terminal on terminal block TB.2. The integrated circuit IC.1 will now switch off the heaters at a total load of 160 amperes, and will not switch them on again until the total load falls below 115 amperes.

The pulse transformer T1 provides line isolation, so that although 120 volts (line to neutral) is applied to the Triacs Q2 and Q3, this voltage never appears on the integrated circuit and the associated components. The highest voltage which will appear in this circuit is about 10 volts.

The high limit thermostatic switch 11 provides protection should the thermostat SW.2 fail to open, or should the control circuit fail. This switch is exposed to the temperature of the water in the pool, and whereas typically the thermostat switch SW.2 will be set at 90°F. switch 11 operates at 120°F, and at that water temperature opens both power lines L1 and L2 to prevent further water heating. This switch SW.1 is of a type requiring manual resetting, thus ensuring that the fault is investigated before power is returned to the heaters 5 and 7.

The integrated circuit specified is internally voltage regulated, while the Zener diode D3 provides protection should the voltage applied to it tend to exceed 10 volts. With the arrangement shown, the improper connection of 110 volts across the current transformer terminals would not cause damage. The heaters 5 and 7 would be automatically turned off by the action of the integrated circuit, while they could not be re-energised as long as that voltage remained on the circuit.

Certain physical features of the system are not specifically shown in the drawing. For example, current carrying components which operate at line voltages, that is the main Triacs Q4 and Q5, the high limit switch 11, and the two heaters 5 and 7, are all prewired at the factory and are totally enclosed in a grounded metal box, with their cases individually connected to ground. The two temperature switches, namely switch 11 and switch SW.2, are mounted in good thermal contact with the top face of this box, which ensures that they will register the warmest temperature of the box.

It will be seen that the apparatus described above enables the addition of a considerable electrical load to an electrical system which has a rating insufficient normally to permit the addition of that load. Apart from the avoidance of the cost of providing a larger service entrance to accommodate the increased maximum load, in many cases the operating cost will be less, since in many electrical tariffs the peak load achieved by the installation affects the total energy charge.

Incidental advantages also accrue, for example the thermostat SW.2 does not need to switch large or inductive currents, and thus its contact life is considerably prolonged.

The invention has been described, by way of example, as applied to the heating of a swimming pool, since this is typical of a large load which can be shed at short notice without the introduction of any danger or inconvenience. The invention can also be applied to other suitable loads, for examle, to electrical storage heaters, and to snow melting heaters on driveways and on roofs. In some cases, it can also be applied to ventilation systems.

The embodiments of the invention in which an exclusive property or privilege is claimed are defined as follows:

1. An electrical load monitoring and switching system comprising:
   a. total load measuring means arranged to monitor an electrical supply;
   b. switch means connectible to control the supply of electrical power from said supply to partial load means forming a substantial part of a total load, but not forming the total load; and
   c. control means arranged to transfer the switch means between a closed condition in which said partial load means are energised as part of said total load from said supply, and an open condition in which said partial load means are no longer so energised; the control means being arranged to receive an input signal from said total load measuring means and to cause transfer of the switch means between the closed condition and the open condition when a first predetermined total load is exceeded; and further to effect a transfer of the switch means between the open condition and the closed position only when the total load falls to less than a second predetermined total load, the difference between the first predetermined total load and the second predetermined total load being larger than the maximum power which the said partial load means can extract from said supply.

2. The system of claim 1, wherein the electrical supply is an alternating current supply and the switch means are pulse operated electronic switches of the type which conduct during each half cycle of the supply only when triggered by such a pulse, and the control means supply such triggering pulses to the switch means to cause conduction; whereby the current controlled by the switch means is made and broken only during zero current voltage crossing points.

3. The system of claim 2, wherein the switch means are Triacs.

4. The load monitoring system of claim 2, wherein the control means includes a lower power solid state pulse generating device, the output from that device is applied to pulse triggered Triac devices, and those Triac devices are arranged to provide more powerful trigger pulses to heavy current Triacs which constitute said switch means.

5. The system of claim 2, wherein an isolating pulse transformer is provided with a primary winding arranged to receive said triggering pulses and with a secondary winding, electrically isolated from said primary winding, arranged to apply said pulses to the switch means.

6. The system of claim 4, wherein an isolating pulse transformer is provided with a primary winding arranged to receive triggering pulses from the low power solid state pulse generating device, and with a secondary winding, electrically isolated from said primary winding, arranged to apply said pulses to the pulse triggered Triac devices.

7. The system of claim 2, wherein the total load measuring means includes a current transformmer arranged to monitor the total load extracted from said supply.

8. The system of claim 2, wherein the total load measuring means includes a current transformer of a type utilising a lead of the power supply as its primary winding.

9. The system of claim 2, wherein the control means are provided with pulse generating means and the pulse generating means are provided with an "inhibit" input connection; and a switch device arranged to be responsive to a variable quantity affected by the operation of the partial load means is connected to said "inhibit" input connection in such a manner that upon said variable quantity reaching a predetermined value, the "inhibit" input connection is effective to stop the emission of pulses by the pulse generating means.

10. The system of claim 1, as applied to a total electrical load which includes electrical heater means for a swimming pool as said partial load means.

* * * * *